US008918319B2

(12) United States Patent
Hu et al.

(10) Patent No.: US 8,918,319 B2
(45) Date of Patent: Dec. 23, 2014

(54) SPEECH RECOGNITION DEVICE AND SPEECH RECOGNITION METHOD USING SPACE-FREQUENCY SPECTRUM

(75) Inventors: Jwu-Sheng Hu, Hsinchu (TW); Ming-Tang Lee, Taoyuan County (TW); Ting-Chao Wang, Taoyuan County (TW); Chia Hsin Yang, New Taipei (TW)

(73) Assignee: National Chiao University, Hsinchu (TW)

( * ) Notice: Subject to any disclaimer, the term of this patent is extended or adjusted under 35 U.S.C. 154(b) by 708 days.

(21) Appl. No.: 13/177,608

(22) Filed: Jul. 7, 2011

(65) Prior Publication Data

US 2012/0310646 A1    Dec. 6, 2012

(30) Foreign Application Priority Data

Jun. 3, 2011  (TW) .............................. 100119556 A

(51) Int. Cl.
*G10L 15/00* (2013.01)
*G10L 15/08* (2006.01)
*G10L 15/02* (2006.01)
*G10L 21/0216* (2013.01)

(52) U.S. Cl.
CPC ................. *G10L 15/02* (2013.01); *G10L 15/08* (2013.01); *G10L 2021/02166* (2013.01)
USPC ........... 704/251; 704/206; 704/231; 704/236; 704/238; 704/255

(58) Field of Classification Search
CPC ......... G10L 15/10; G10L 15/12; G10L 15/02; G10L 15/08; G10L 2021/02166
USPC .......................................... 704/231, 236, 238
See application file for complete search history.

(56) References Cited

U.S. PATENT DOCUMENTS

| | | | |
|---|---|---|---|
| 4,081,607 A | 3/1978 | Vitols et al. | |
| 2001/0018654 A1* | 8/2001 | Hon et al. | 704/257 |
| 2002/0184006 A1* | 12/2002 | Yoshioka et al. | 704/205 |
| 2006/0074686 A1 | 4/2006 | Vignoli | |
| 2008/0162137 A1* | 7/2008 | Saitoh et al. | 704/251 |
| 2010/0217590 A1* | 8/2010 | Nemer et al. | 704/233 |
| 2011/0213614 A1* | 9/2011 | Lu et al. | 704/236 |

OTHER PUBLICATIONS

Argentieri et al "Broadband Variations of the MUSIC High-Resolution Method for Sound Source Localization in Robotics", Oct.-Nov. 2007, Proceedings of the IEEE/RSJ International Conferences on Intelligent Robots and Systems, pp. 2009-2014.*

(Continued)

*Primary Examiner* — James Wozniak
*Assistant Examiner* — Oluwadamilola M Ogunbiyi
(74) *Attorney, Agent, or Firm* — Rosenberg, Klein & Lee

(57) ABSTRACT

In a speech recognition device and a speech recognition method, a key phrase containing at least one key word is received. The speech recognition method comprises steps: receiving a sound source signal of a key word and generating a plurality of audio signals; transforming the audio signals into a plurality of frequency signals; receiving the frequency signals to obtain a space-frequency spectrum and an angular estimation value thereof; receiving the space-frequency spectrum to define and output at least one spatial eigenparameter, and using the angular estimation value and the frequency signals to perform spotting and evaluation and outputting a Bhattacharyya distance; and receiving the spatial eigenparameter and the Bhattacharyya distance and using corresponding thresholds to determine correctness of the key phrase. Thereby this invention robustly achieves high speech recognition rate under very low SNR conditions.

27 Claims, 7 Drawing Sheets

(56) References Cited

OTHER PUBLICATIONS

Hershey et al "Variational Bhattacharyya Divergence for Hidden Markov Models" 2008, IEEE International Conference on Acoustics, Speech and Signal Processing, pp. 4557-4560).*

Hu et al "An embedded audio—visual tracking and speech purification system on a dual-core processor platform", Microprocessors and Microsystems vol. 34, 2010, pp. 274-284.*

Këpuska et al "A novel Wake-Up-Word speech recognition system, Wake-Up-Word recognition task, technology and evaluation", 2009, Nonlinear Analysis, vol. 71, pp. e2772-e2789.*

Veton Kepuska, Jason Breitfeller; "Wake-Up Word Speech Recognition Application for First Responder Communication Enhancement," Proc. SPIE, vol. 6201, 2006.

V.Z. Kepuska, T.B. Klein; "A Novel Wake-Up-Word Speech Recognition System, Wake-Up-Word Recognition Task, Technology and Evaluation," Nonlinear Analysis: Theory, Methods & Applications, vol. 71, Issue 12, pp. e2772-e2789, Dec. 2009.

Michael L. Seltzer, Bhiksha Raj, Richard M. Stern, "Likelihood-Maximizing Beamforming for Robust Hands-Free Speech Recognition," IEEE Transactions on Speech and Audio Processing, vol. 12, No. 5, Sep. 2004, pp. 489-498.

* cited by examiner

SPEECH RECOGNITION DEVICE AND SPEECH RECOGNITION METHOD USING SPACE-FREQUENCY SPECTRUM

BACKGROUND OF THE INVENTION

1. Field of the Invention

The present invention relates to a recognition technology, particularly to a speech recognition device and a speech recognition method.

2. Description of the Related Art

Keyword detection or spotting plays an important role in speech recognition technologies. The speech recognition process includes obtaining the eigenparameters of speech, constructing models for the speech characteristics, and establishing a comparison method for the eigenparameters (calculating distance or similarity). Speech recognition technologies have developed for many years, and a large-scale vocabulary database has been able to achieve a not-bad recognition rate. However, the existing speech recognition technologies are hard to maintain a given level of recognition rate when the environment is contaminated by noise or competing speeches, even for a single keyword. In fact, noise is inevitable for a practical environment.

In the existing ASR (Automatic Speech Recognition) system, determining when to start automatic speech recognition is an important function, which is usually called a wake-up function or a push button. Appropriately using the wake-up function can greatly reduce the error rate of recognition. In a computer or mobile phone, the wake-up function is normally realized via a touch-control operation or a push button. However, such an implementation needs a premise that the hand of the user can reach the device or machine. If the device is not beside the user, the user normally wears a wireless device to generate a reliable wake-up signal. For example, the user has to wear a wireless device to instruct a household robot. However, it is difficult for the user is hard to always wear a wireless device at his home. Therefore, such a measure has barriers in many applications. Thus, how to realize a wake-up function without wearing any device has become a practical and challenging subject. When the controller interface of a controlled device is out of vision, the wake-up function can only be realized via speech. It seems to be a simple problem of recognizing a single keyword. However, the speaker may be remote from the receiver device, or the environment is noisy. In fact, SNR (Signal-to-Noise Ratio) is normally very poor in practical applications. Similar to the push button or touch control, the speech-based wake-up function should also possess almost 100% detection rate and almost 0% false positive rate lest the controlled device act wrong or slowly.

Accordingly, the present invention proposes a speech recognition device and a speech recognition method to solve the conventional problems.

SUMMARY OF THE INVENTION

The primary objective of the present invention is to provide a speech recognition device and a method thereof, which are based on the spatial eigenspace consistency of the sound source in the sound pick-up array and the similarity of the speech features of the keyword, and which uses a detection device to integrate the recognition results of the separate features to determine whether the keyword exists in the speech. After tested with massive acoustic corpora, the present invention is proved to have a detection rate of 100% and a false positive rate of 10.32% under −3.82 dB SNR.

To achieve the abovementioned objective, the present invention proposes a speech recognition device, which receives and recognizes at least one key phrase containing at least one key word, and which comprises a sound pick-up array, a frequency-domain converter, a spatial feature spotting device, a speech feature spotting and evaluation device and a detection device. The sound pick-up array receives a sound source signal of a key word to generate a plurality of audio signals. The frequency-domain converter receives the audio signals and transforms the audio signals into a plurality of frequency signals. The frequency-domain converter connects with the spatial feature spotting device and the speech feature spotting and evaluation device. The spatial feature spotting device connects with the speech feature spotting and evaluation device. The spatial feature spotting device receives the frequency signals to obtain a space-frequency spectrum and calculate the angular estimation value thereof. The speech feature spotting and evaluation device receives the angular estimation value and the frequency signals to perform spotting and evaluation and then outputs a Bhattacharyya distance. The spatial feature spotting device further connects with a spatial evaluator, which receives the space-frequency spectrum to define and output at least one spatial eigenparameter. Both the spatial evaluator and the speech feature spotting and evaluation device connect with a detection device which presets thresholds for the spatial eigenparameter and the Bhattacharyya distance. The detection device receives the spatial eigenparameter and the Bhattacharyya distance and uses the thresholds to determine the correctness of the key word.

The present invention also proposes a speech recognition method, wherein at least one key phrase containing at least one key word is received and recognized. The method of the present invention comprises the following steps: receiving a sound source signal of a key word to generate a plurality of audio signals; transforming the audio signals into a plurality of frequency signals; receiving the frequency signals to obtain a space-frequency spectrum and calculating the angular estimation value thereof; receiving the space-frequency spectrum, the angular estimation value and the frequency signals and using the space-frequency spectrum to define at least one spatial eigenparameter and then output it; using the angular estimation value and the frequency signals to perform spotting and evaluation and outputting a Bhattacharyya distance; receiving the spatial eigenparameter and the Bhattacharyya distance and using the corresponding thresholds to determine the correctness of the key phrase.

Below, the embodiments are described in detail in cooperation with the drawings to make easily understood the technical contents and accomplishments of the present invention.

DETAILED DESCRIPTION OF THE INVENTION

The present invention is based on the similarity of the resonance curves of the audio signal of the key word and the consistency of the spatial features of the audio signal of the key word. Suppose a key phrase contains three key words arranged in a specified sequence. Thus, the three key words should have an identical eigenspace. In the case that sounds are transmitted to a microphone array, the three words should come from an identical sound source. Once the abovementioned condition is satisfied, the obtained eigenspace signals are used to evaluate the similarity between the target key words and the three words. Such an approach has an advantage that the eigenspace signals are less sensitive to the environment. Therefore, the speech recognition rate can be greatly improved. Thereby, the technology of the present invention can detect key words remotely or function as a vocal key word-based wake-up mechanism in a noisy environment.

Figure 1:
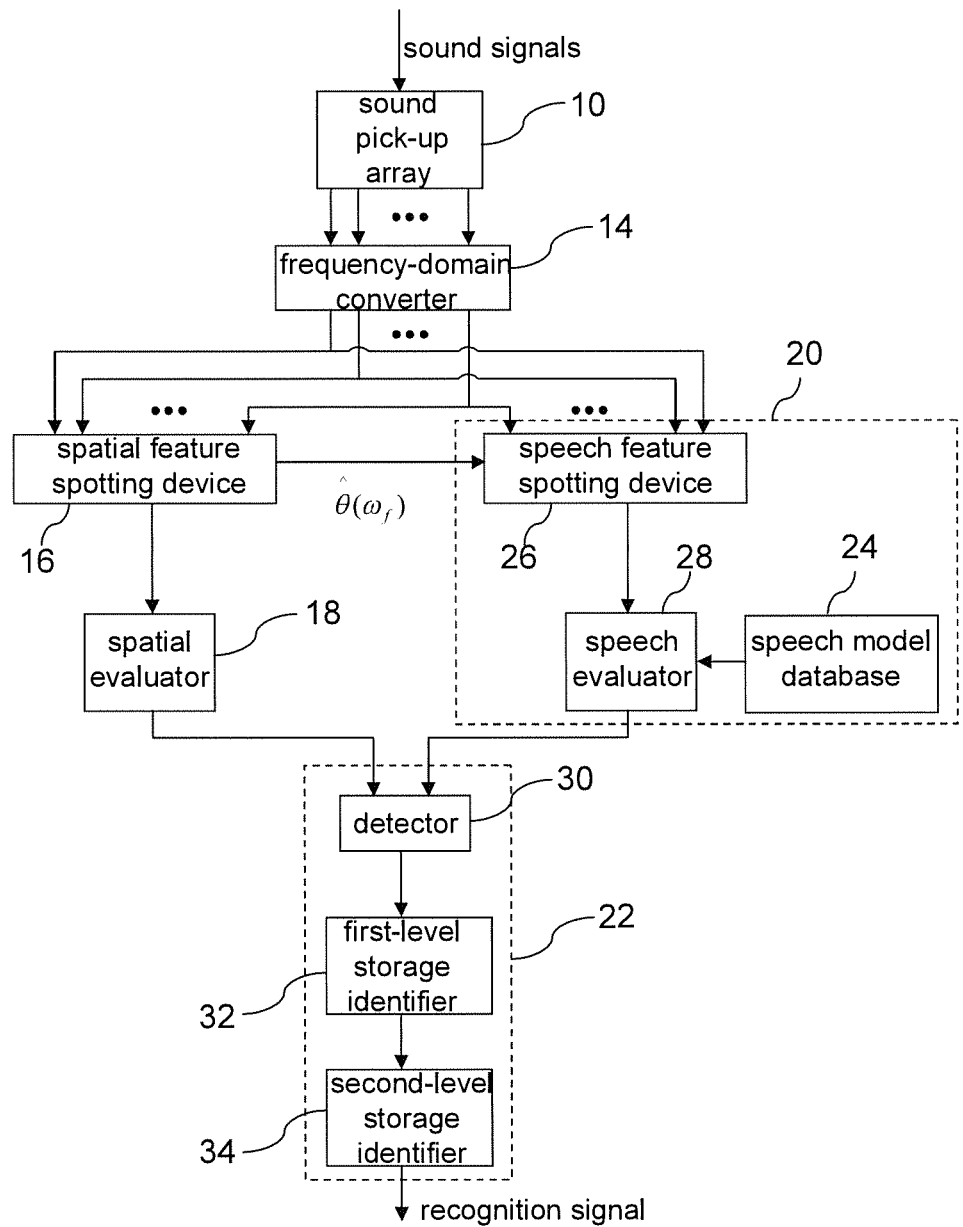
FIG. 1 is a block diagram schematically showing the architecture of a speech recognition device according to one embodiment of the present invention.
Figure 2:
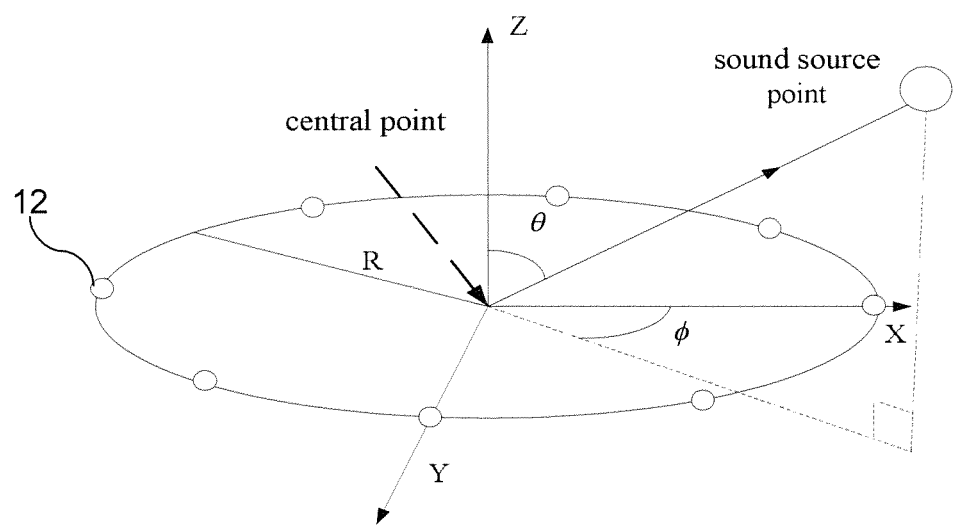
FIG. 2 is a perspective view schematically showing the relative positions of a sound pick-up array and a sound source point according to one embodiment of the present invention.

Refer to FIG. 1 and FIG. 2. The speech recognition device of the present invention receives at least one key phrase containing at least one key word, and the key word further has been divided into a plurality of sound frames. The speech recognition device of the present invention comprises a sound pick-up array 10, a frequency-domain converter 14, a spatial feature spotting device 16, a speech feature spotting and evaluation device 20, and a detection device 22. The sound pick-up array 10 may be a microphone array and includes a plurality of receivers 12 arranged annularly on a plane. The annular arrangement has a central point, and the distance between the central point and the circumference of the annularity is R. The central point is used as the origin of a Cartesian coordinate system having a latitudinal axis X, a longitudinal axis Y and a vertical axis Z. The sound pick-up array 10 receives sound source signals of all the sound frames of the key word successively to generate a plurality of audio signals. The sound source point of the sound source signals, the abovementioned central point and the abovementioned plane form a triangular plane vertical to the abovementioned plane. The base of the triangular plane and the latitudinal axis X contain an angle φ. The hypotenuse of the triangular plane and the vertical axis Z contain an angle θ. The sound pick-up array 10 connects with the frequency-domain converter 14, which may be realized by an FFT (Fast Fourier Transform) converter or a DCT (Discrete Cosine Transform) converter. The frequency-domain converter 14 receives the audio signals and transforms the audio signals into a plurality of frequency signals.

The frequency-domain converter 14 connects with the spatial feature spotting device 16 and a spatial evaluator 18. The spatial feature spotting device 16 receives the frequency signals to obtain a space-frequency spectrum and calculate the angular estimation value $$\hat{\theta}(\omega_f) = \arg\max_{\theta} S(\theta, \omega_f)$$

thereof. The space-frequency spectrum can be expressed by $$S(\theta, \omega_f) = \frac{1}{a^H(\theta, \omega_f) P_N(\omega_f) a(\theta, \omega_f)},$$

wherein f=1 ... F, and wherein F denotes FFT size, and wherein $\omega_f$ denotes frequency, and wherein $a(\theta,\omega_f)$ and $a^H(\theta,\omega_f)$ are respectively the transposed $a^T(\theta,\omega_f)$ and conjugated $a^T(\theta,\omega_f)$.

$$a^T(\theta, \omega_f) = \left[ e^{j2\pi\omega_f * R\sin\varphi\cos\theta/c}, \right.$$
$$\left. e^{j2\pi\omega_f * R\sin\varphi\cos(\theta-2\pi/M)/c}, \ldots, e^{j2\pi\omega_f * R\sin\varphi\cos(\theta-2(M-1)\pi/M)/c} \right],$$

wherein c denotes light speed, and M is the number of the receivers 12 of the sound pick-up array 10.

$$P_N(\omega_f) = \sum_{i=2}^{M} V(\omega_f)_i V(\omega_f)_i^H.$$

Figure 3A:
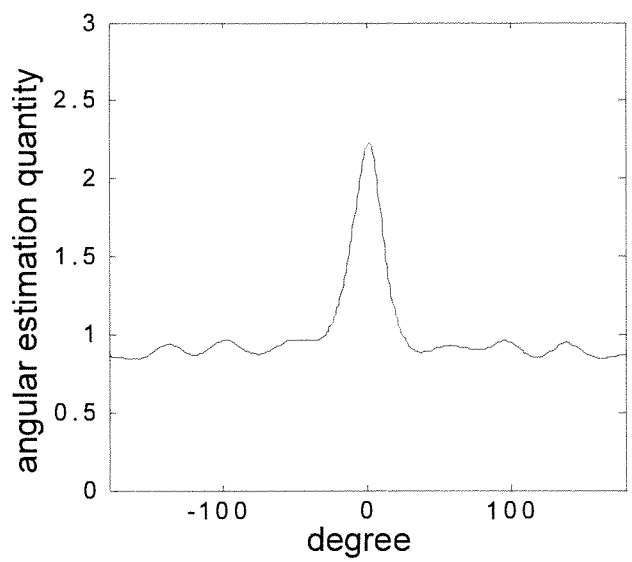
FIG. 3(a) is a diagram showing spatial distribution of angular estimation quantities of a key word according to one embodiment of the present invention.
Figure 3B:
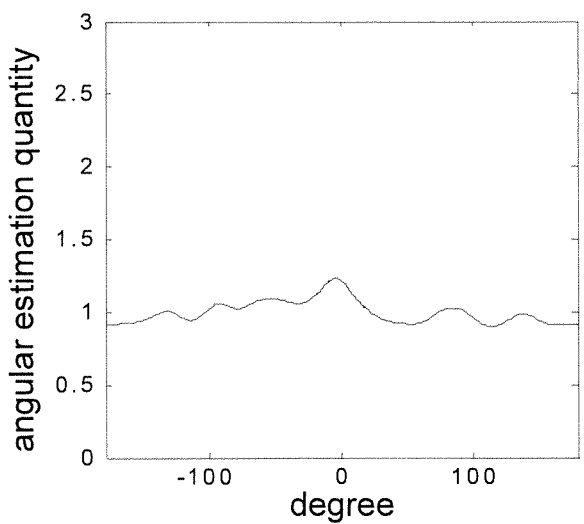
FIG. 3(b) is a diagram showing spatial distribution of angular estimation quantities of a non-key word according to one embodiment of the present invention.
Figure 4A:
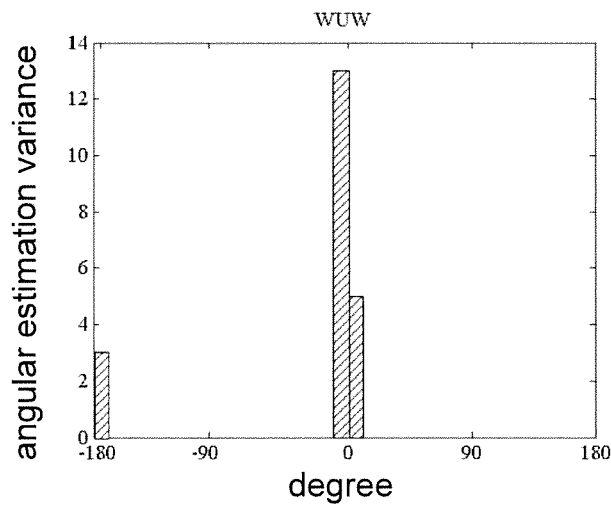
FIG. 4(a) is a diagram showing spatial distribution of angular estimation variance of a key word according to one embodiment of the present invention.
Figure 4B:
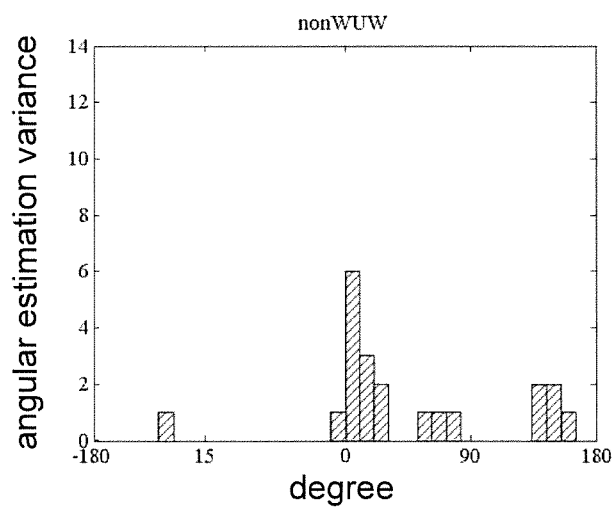
FIG. 4(b) is a diagram showing spatial distribution of angular estimation variance of a non-key word according to one embodiment of the present invention.

$V(\omega_f)_i$ and $V(\omega_f)_i^H$ are eigenvectors of a correlation matrix $R_{xx}$, which is obtained via the frequency signals. $R_{xx}(\omega_f, k) = E(X(\omega_f, k), X(\omega_f, k)^H)$, wherein $x(\omega_f, k)$ is the frequency signal. Besides, $$R_{XX}(\omega_f) = \sum_{i=1}^{M} \lambda_i(\omega_f) V_i(\omega_f) V_i^H(\omega_f),$$

wherein $\lambda_i(\omega_f)$ is the eigenvalue of the correlation matrix. The spatial evaluator 18 receives the space-frequency spectrum to define and output at least one spatial eigenparameter. Besides, the spatial evaluator 18 can simultaneously receive the space-frequency spectrum and the angular estimation value to define and output two spatial eigenparameters. This embodiment uses the latter case to exemplify the present invention. The spatial eigenparameter defined by the space-frequency spectrum is an angular estimation quantity $$x_1 = \max_{\theta} \left[ \frac{\sum_{F \in F'} S(\theta, \omega_f)}{D} \right],$$

wherein D is the normalization factor and F' the formant frequency band. The spatial eigenparameter defined by the angular estimation value is an angular estimation variance $x_2 = \mathrm{var}(\theta(\omega_f))$, wherein f∈F'. FIG. 3(a) and FIG. 3(b) are respectively the spatial distributions of the angular estimation quantities of a key word and a non-key word. The angular estimation quantity is defined by the peak of the distribution. Therefore, the key word has a higher angular estimation quantity than the non-key word. FIG. 4(a) and FIG. 4(b) are respectively the spatial distributions of the angular estimation variances of a key word and a non-key word. The angular estimation variance is related to the dispersity in the distribution. Therefore, the key word has a lower angular estimation variance than the non-key word. In other words, the angular estimation quantity and the angular estimation variance can verify the eigenspace consistency of the sound source signal.

As shown in FIG. 1, the speech feature spotting and evaluation device 20 connects with the spatial feature spotting device 16 and the frequency-domain converter 14 and receives the angular estimation values and the frequency signals for performing spotting and estimation and then outputs a Bhattacharyya distance. The spatial evaluator 18 and the speech feature spotting and evaluation device 20 further connect with the detection device 22 where are preset thresholds corresponding to the spatial eigenparameter and the Bhattacharyya distance. The detection device 22 receives the spatial eigenparameter and the Bhattacharyya distance and uses the thresholds to determine correctness of the key word.

Figure 5A:
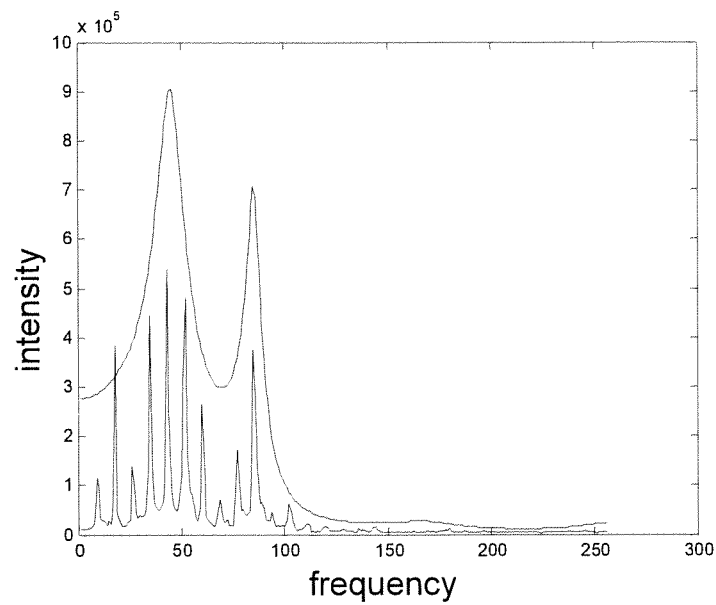
FIG. 5(a) and FIG. 5(b) are diagrams respectively showing resonance model curves and input speech feature curves of different key words.
Figure 5B:
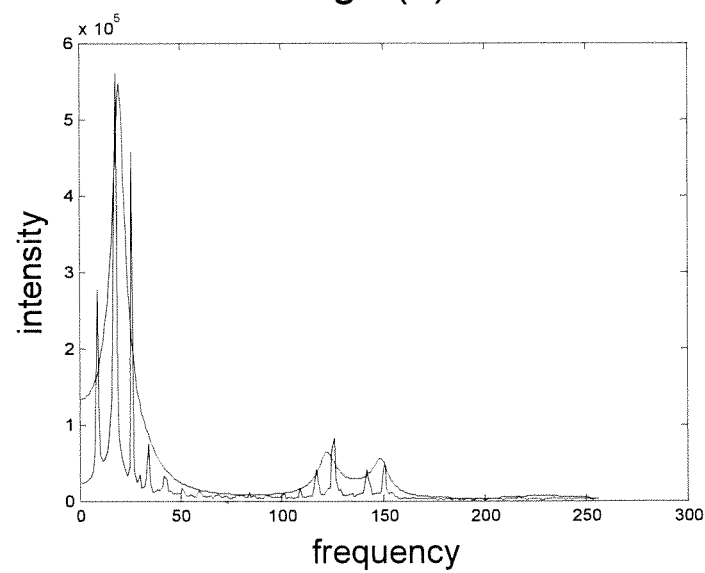

The speech feature spotting and evaluation device 20 includes a speech model database 24, a speech feature spotting device 26, and a speech evaluator 28. The speech model database 24 stores the data of a plurality of resonance models. The speech feature spotting device 26 connects with the spatial feature spotting device 16 and the frequency-domain converter 14 and receives the angular estimation values and the frequency signals to obtain speech feature data. The abovementioned data of resonance models includes peaks and curves of resonance models. Corresponding to the abovementioned two types of data of resonance models, the input speech feature data includes speech feature peaks and speech feature curves. The speech evaluator 28 connects with the speech feature spotting device 26 and the speech model database 24 and receives the input speech feature data. From the speech model database 24, the speech evaluator 28 obtains resonance model data corresponding to the input speech feature data, evaluates the input speech feature data and then outputs a Bhattacharyya distance. In this embodiment, the resonance model data and the input speech feature data are respectively exemplified by resonance model curves and input speech feature curves. Each of FIG. 5(a) and FIG. 5(b) has two curves; the upper one is a resonance model curve, and the lower one is a input speech feature curve. The speech evaluator 28 evaluates the two types of curves and then outputs a Bhattacharyya distance, which may be expressed by $BC(p,q) = \int \sqrt{p(x)q(x)} dx$, wherein $p(x)$ is the input speech feature curve and $q(x)$ is the resonance model curve.

Refer to FIG. 1 again. The detection device 22 includes a cascade detector 30, a first-level storage identifier 32 and a second-level storage identifier 34. The detector 30 connects with the spatial evaluator 18 and the speech evaluator 28 of the speech feature spotting and evaluation device 20 and receives the spatial eigenparameter and the Bhattacharyya distance of each sound frame. Thresholds are preset in the detector 30. The detector 30 evaluates the spatial eigenparameter and the Bhattacharyya distance and outputs a first-level correctness flag for a correct sound frame or a first-level incorrectness flag for a wrong sound frame according to the preset thresholds. For example, when at least one of the spatial eigenparameter and the Bhattacharyya distance is equal to or smaller than the corresponding detection threshold, the detector 30 outputs a first-level incorrectness flag. When both the spatial eigenparameter and the Bhattacharyya distance are greater than the corresponding thresholds, the detector 30 outputs a first-level correctness flag.

The first-level storage identifier 32 connects with the detector 30 and then receives and stores the first-level correctness flag or first-level incorrectness flag of each sound frame. After having stored all the first-level correctness flags and first-level incorrectness flags of a key word, the first-level storage identifier 32 outputs a second-level correctness flag for a correct key word or a second-level incorrectness flag for a wrong key word according to the quantities of the first-level correctness flags and first-level incorrectness flags. For example, a first-level identification value is preset in the first-level storage identifier 32; the first-level storage identifier 32 examines the ratio of the first-level correctness flags of a key word to all the flags of the key word; when the ratio is greater than the first-level identification value, the first-level storage identifier 32 outputs a second-level correctness flag; when the ratio is equal to or smaller than the first-level identification value, the first-level storage identifier 32 outputs a second-level incorrectness flag.

The second-level storage identifier 34 connects with the first-level storage identifier 32. Suppose that the key phrase has two or more key words. The second-level storage identifier 34 receives and stores the second-level correctness flags or second-level incorrectness flags of each key word. After having stored all the second-level correctness flags and second-level incorrectness flags of the key phrase, the second-level storage identifier 34 outputs a correctness signal for a key phrase or an incorrectness signal for a wrong phrase. For example, a second-level identification value is preset in the second-level storage identifier 34; the second-level storage identifier 34 examines the ratio of the second-level correctness flags of a key phrase to all the flags of the key phrase; when the ratio is greater than the second-level identification value, the second-level storage identifier 34 outputs a correctness signal; when the ratio is equal to or smaller than the second-level identification value, the second-level storage identifier 34 outputs an incorrectness signal. All the key words should come from an identical sound source. Based on the eigenspace consistency of the sound sources in the sound pick-up array and the similarity of the speech features of the key words, the detection device integrates the identification results of all the characteristics to determine whether the specified key words exist. After tested with massive acoustic corpora, the present invention is proved to have a detection rate of 100% and a false positive rate of 10.32% under −3.82 dB SNR. The present invention can robustly achieve pretty high recognition rate even in an environment of a very low SNR. Therefore, the technology of the present invention can detect key words remotely or function as a vocal key word-based wake-up mechanism in a noisy environment.

Figure 6:
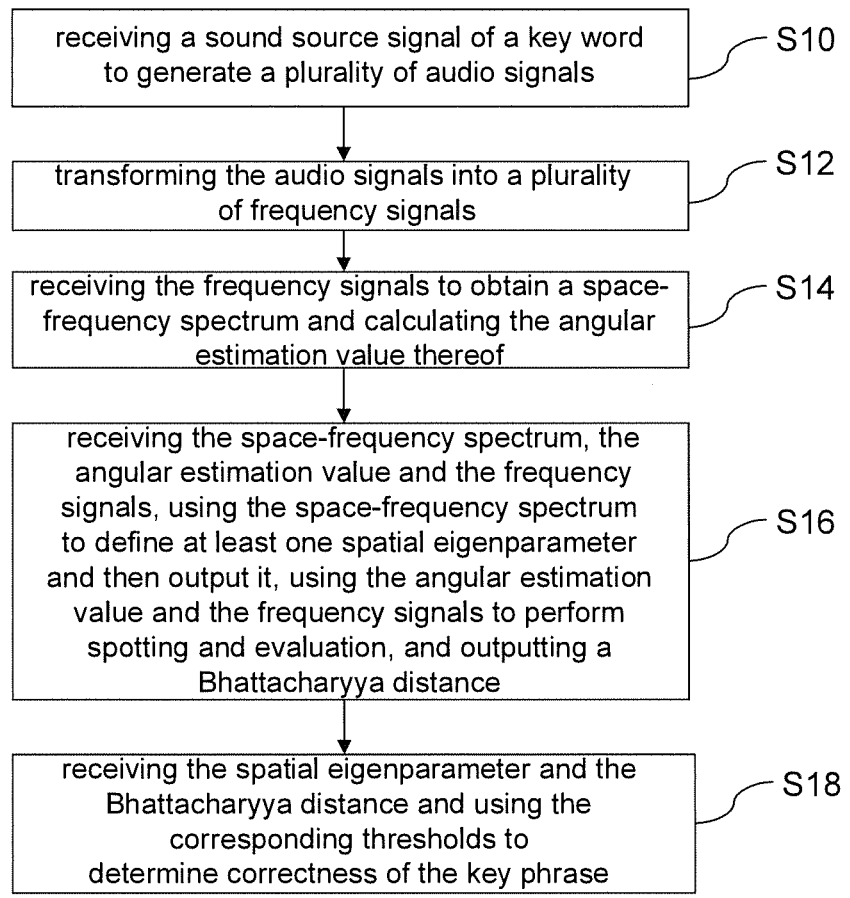
FIG. 6 is a flowchart of a speech recognition method according to one embodiment of the present invention.

Refer to FIG. 6 for a flowchart of a speech recognition method according to one embodiment of the present invention.

In Step S10, a sound pick-up array 10 continuously receives the sound source signal of each sound frame to generate audio signals. Next, In Step S12, a frequency-domain converter 14 receives the audio signals and transforms the audio signals into frequency signals. Next, in Step S14, a spatial feature spotting device 16 receives the frequency signals to obtain a space-frequency spectrum and calculate the angular estimation value thereof. Next, in Step S16, a spatial evaluator 18 receives the space-frequency spectrum to define and output at least one spatial eigenparameter. At the same time, a speech feature spotting and evaluation device 20 receives the angular estimation value and the frequency signals to perform spotting and evaluation and output a Bhattacharyya distance. The spotting can be undertaken with an LPC (Linear Predictive Coding) method or an MFCC (Mel-scale Frequency Cepstral Coefficient) method. In Step S16, in addition to receive the space-frequency spectrum to define and output at least one spatial eigenparameter, the spatial evaluator 18 can also simultaneously receive the space-frequency spectrum and the angular estimation value to define and output at least two spatial eigenparameters. In this embodiment, the present invention is exemplified with the latter case, wherein the spatial eigenparameter defined by the space-frequency spectrum is an angular estimation quantity, and wherein the spatial eigenparameter defined by the angular estimation value is an angular estimation variance. Then, in Step S18, a detection device 22 receives the spatial eigenparameters and the Bhattacharyya distance and compares them with corresponding thresholds to determine the correctness of the key phrase.

In the abovementioned process, the step, wherein the speech feature spotting and evaluation device 20 receives the angular estimation value and the frequency signals to perform spotting and evaluation and output a Bhattacharyya distance, further comprises the following steps. Firstly, the speech feature spotting device 26 receives the angular estimation values and the frequency signals to obtain speech feature data. Next, a speech evaluator 28 receives speech feature data. From a speech model database 24, the speech evaluator 28 obtains resonance model data corresponding to the speech feature data, evaluates the speech feature data and then outputs a Bhattacharyya distance.

Figure 7:
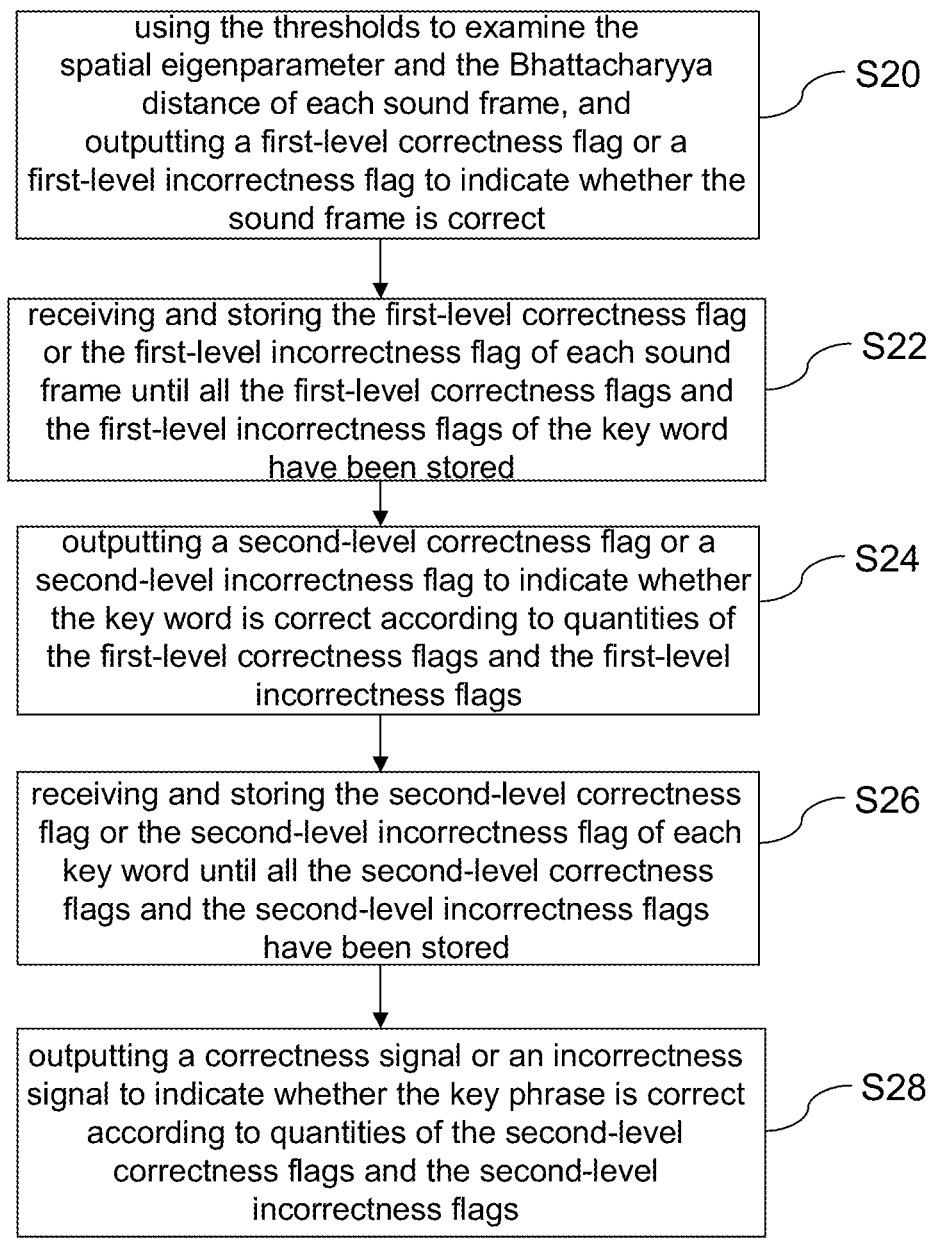
FIG. 7 is a flowchart of determining the correctness of a key phrase according to one embodiment of the present invention.

The step, wherein detection device 22 uses the thresholds to determine the correctness of the key phrase, further comprises the following steps. Refer to FIG. 1 and FIG. 7. In Step S20, a detector 30 evaluates the spatial eigenparameter and the Bhattacharyya distance of each sound frame and outputs a first-level correctness flag for a correct sound frame or a first-level incorrectness flag for a wrong sound frame according to the preset thresholds. Step S20 may be realized with the following sub-steps: the detector 30 determines whether at least one of the spatial eigenparameter and the Bhattacharyya distance is equal to or smaller than the corresponding detection threshold; if the answer is "yes", the detector 30 outputs a first-level incorrectness flag; if the answer is "no", the detector 30 outputs a first-level correctness flag.

Next, in Step 22, a first-level storage identifier 32 receives and stores the first-level correctness flag or first-level incorrectness flag of each sound frame. After all the first-level correctness flags and first-level incorrectness flags of a key word have been stored, the process proceeds to Step 24. In Step S24, the first-level storage identifier 32 outputs a second-level correctness flag for a correct key word or a second-level incorrectness flag for a wrong key word according to the quantities of the first-level correctness flags and first-level incorrectness flags. Step S24 may be realized with the following sub-steps: a first-level identification value is preset in the first-level storage identifier 32; the first-level storage identifier 32 examines whether the ratio of the first-level correctness flags of a key word to all the flags of the key word is greater than the first-level identification value; if the answer is "yes", the first-level storage identifier 32 outputs a second-level correctness flag; if the answer is "no", the first-level storage identifier 32 outputs a second-level incorrectness flag.

When the key phrase has two or more key words, the following steps are undertaken after Step S24. In Step S26, a second-level storage identifier 34 receives and stores the second-level correctness flags or second-level incorrectness flags of each key word. After all the second-level correctness flags and second-level incorrectness flags of the key phrase have been stored, the process proceeds to Step S28. In Step S28, the second-level storage identifier 34 outputs a correctness signal for a correct key phrase or an incorrectness signal for a wrong phrase according to the quantities of the second-level correctness flags and second-level incorrectness flags. Step S28 may be realized with the following sub-steps: a second-level identification value is preset in the second-level storage identifier 34; the second-level storage identifier 34 examines whether the ratio of the second-level correctness flags of a key phrase to all the flags of the key phrase is greater than the second-level identification value; if the answer is "yes", the second-level storage identifier 34 outputs a correctness signal; if the answer is "no", the second-level storage identifier 34 outputs an incorrectness signal.

In conclusion, the present invention promotes robustness of key word recognition via integrating evaluation of the spatial eigenspace consistency of the key word and evaluation of the similarity of the resonance curves of the key word.

The embodiments described abovementioned are only to exemplify the present invention but not to limit the scope of the present invention. Any equivalent modification or variation according to the characteristic or spirit of the present invention is to be also included within the scope of the present invention.

What is claimed is:

1. A speech recognition device, which receives and recognizes at least one key phrase containing at least one key word, comprising
   a sound pick-up array receiving a sound source signal of said key word to generate a plurality of audio signals;
   a frequency-domain converter connecting with said sound pick-up array to receive said audio signals and transforming said audio signals into a plurality of frequency signals;
   a spatial feature spotting device connecting with said frequency-domain converter to receive said frequency signals and obtaining a space-frequency spectrum and an angular estimation value therefrom;
   a spatial evaluator connecting with said spatial feature spotting device to receive said space-frequency spectrum and defining and outputting at least one spatial eigenparameter;
   a speech feature spotting and evaluation device connecting with said spatial feature spotting device and said frequency-domain converter to receive said angular estimation value and said frequency signals for performing spotting and evaluation and outputting a Bhattacharyya distance; and
   a detection device connecting with said spatial evaluator and said speech feature spotting and evaluation device to receive said spatial eigenparameter and said Bhattacharyya distance, having thresholds corresponding to said spatial eigenparameter and said Bhattacharyya distance preset, and using said spatial eigenparameter, said Bhattacharyya distance and said thresholds to determine whether said key phrase is correct;
   wherein said sound pick-up array is in form of an annular arrangement on an identical plane, and wherein said annular arrangement has a central point, and wherein distance between said central point and a circumference of said annular arrangement is R, and wherein said central point is used as an origin of a Cartesian coordinate system having a latitudinal axis X, a longitudinal axis Y and a vertical axis Z, and wherein a sound source point of said sound source signal, said central point and said plane form a triangular plane vertical to said plane, and wherein an angle $\phi$ is contained between a base of said triangular plane and said latitudinal axis X, and wherein an angle $\theta$ is contained between a hypotenuse of said triangular plane and said vertical axis Z, and wherein said space-frequency spectrum is expressed by $$S(\theta, \omega_f) = \frac{1}{a^H(\theta, \omega_f) P_N(\omega_f) a(\theta, \omega_f)},$$

and wherein f=1 ... F, and wherein F denotes FFT size, and wherein $\omega_f$ denotes frequency, and wherein $a(\theta,\omega_f)$ and $a^H(\theta,\omega_f)$ are respectively a transposed $a^T(\theta,\omega_f)$ and a conjugated $a^T(\theta,\omega_f)$, and wherein $$a^T(\theta, \omega_f) = [e^{j2\pi\omega_f * R\sin\varphi\cos\theta/c},$$
$$e^{j2\pi\omega_f * R\sin\varphi\cos(\theta-2\pi/M)/c}, \ldots, e^{j2\pi\omega_f * R\sin\varphi\cos(\theta-2(M-1)\pi/M)/c}],$$

and wherein c denotes light speed, and M is a number of receivers of said sound pick-up array, and wherein $$P_N(\omega_f) = \sum_{i=2}^{M} V(\omega_f)_i V(\omega_f)_i^H,$$

and wherein $V(\omega_f)_i$ and $V(\omega_f)_i^H$ are eigenvectors of a correlation matrix $R_{xx}$, which is obtained via said frequency signals, and wherein $R_{XX}(\omega_f,k)=E(X(\omega_f,k), X(\omega_f,k)^H)$, and wherein $X(\omega_f,k)$ is said frequency signal, and wherein $$R_{XX}(\omega_f) = \sum_{i=1}^{M} \lambda_i(\omega_f) V_i(\omega_f) V_i^H(\omega_f),$$

and wherein $\lambda_i(\omega_f)$ is an eigenvalue of said correlation matrix;
wherein said spatial evaluator simultaneously receives said space-frequency spectrum and said angular estimation value to define and output two said spatial eigenparameters; and
wherein said spatial eigenparameter defined by said space-frequency spectrum is an angular estimation quantity $$x_1 = \max_{\theta} \left[ \frac{\sum_{f \in F'} S(\theta, \omega_f)}{D} \right],$$

and wherein D is a normalization factor and F' a formant frequency band, and wherein said spatial eigenparameter defined by said angular estimation value is an angular estimation variance $x_2=\mathrm{var}(\hat{\theta}(\omega_f))$, and wherein $f \in F'$.

2. The speech recognition device according to claim 1, wherein said angular estimation value $\hat{\theta}(\omega_f) = \arg\max_{\theta} S(\theta, \omega_f)$.

3. The speech recognition device according to claim 1, wherein said speech feature spotting and evaluation device includes
a speech model database storing several types of resonance model data;
a speech feature spotting device connecting with said spatial feature spotting device and said frequency-domain converter and receiving said angular estimation value and said frequency signals to obtain speech feature data; and a speech evaluator connecting with said speech feature spotting device and said speech model database and receiving said speech feature data, obtaining from said speech model database one said resonance model data corresponding to said speech feature data to evaluate said speech feature data and then outputting said Bhattacharyya distance.

4. The speech recognition device according to claim 3, wherein when said several types of resonance model data are respectively curves and peaks of said resonance models, said speech feature data are respectively speech feature curves and speech feature peaks.

5. The speech recognition device according to claim 4, wherein said Bhattacharyya distance is expressed by $BC(p,q)=\int \sqrt{p(x)q(x)}dx$, and wherein $p(x)$ is said speech feature curve and $q(x)$ is said resonance model curve.

6. The speech recognition device according to claim 1, wherein said key word has a plurality of sound frames, and wherein said sound pick-up array successively receives said sound signal of each said sound frame for operations of said frequency-domain converter, said spatial feature spotting device, said spatial evaluator, said speech feature spotting and evaluation device and said detection device.

7. The speech recognition device according to claim 1, wherein said detection device further comprises
a detector connecting with said spatial evaluator and said speech feature spotting and evaluation device, receiving said spatial eigenparameter and said Bhattacharyya distance of each said sound frame, having said thresholds preset thereinside, and using said thresholds to examine said spatial eigenparameter and said Bhattacharyya distance and output a first-level correctness flag for a correct said sound frame or a first-level incorrectness flag for a wrong said sound frame according to said thresholds; and
a first-level storage identifier connecting with said detector, receiving and storing said first-level correctness flag or said first-level incorrectness flag of each said sound frame until all said first-level correctness flags and said first-level incorrectness flags of said key word have been stored, and outputting a second-level correctness flag or a second-level incorrectness flag to indicate whether said key word is correct or wrong according to quantities of said first-level correctness flags and said first-level incorrectness flags.

8. The speech recognition device according to claim 7, wherein when at least one of said spatial eigenparameter and said Bhattacharyya distance is equal to or smaller than a corresponding said threshold, said detector outputs said first-level incorrectness flag, and wherein when both said spatial eigenparameter and said Bhattacharyya distance are greater than corresponding said thresholds, said detector outputs said first-level correctness flag.

9. The speech recognition device according to claim 7, wherein a first-level identification value is preset in said first-level storage identifier, and wherein said first-level storage identifier examines a ratio of said first-level correctness flags of said key word to all said flags of said key word, and wherein when said ratio is greater than said first-level identification value, said first-level storage identifier outputs said second-level correctness flag, and wherein when said ratio is equal to or smaller than said first-level identification value, said first-level storage identifier outputs said second-level incorrectness flag.

10. The speech recognition device according to claim 7 further comprises a second-level storage identifier connecting with said first-level storage identifier, wherein when said key phrase has two or more said key words, said second-level storage identifier receives and stores one said second-level correctness flag or one said second-level incorrectness flag of each said key word until all said second-level correctness flags and said second-level incorrectness flags of said key phrase have been stored and then outputs a correctness signal or an incorrectness signal to indicate whether said phrase is correct or wrong according to quantities of said second-level correctness flags and said second-level incorrectness flags.

11. The speech recognition device according to claim 10, wherein a second-level identification value is preset said second-level storage identifier, and wherein said second-level storage identifier examines a ratio of said second-level correctness flags of said key phrase to all said flags of said key phrase, and wherein when said ratio is greater than said second-level identification value, said second-level storage identifier outputs said correctness signal, and wherein when said ratio is equal to or smaller than said second-level identification value, said second-level storage identifier outputs said incorrectness signal.

12. The speech recognition device according to claim 10, wherein said detector is a cascade-type one.

13. The speech recognition device according to claim 1, wherein said speech feature spotting and evaluation device uses an LPC (Linear Predictive Coding) method or an MFCC (Mel-scale Frequency Cepstral Coefficient) method to undertake spotting activities according to said angular estimation values and said frequency signals.

14. The speech recognition device according to claim 1, wherein said sound pick-up array is a microphone array.

15. The speech recognition device according to claim 1, wherein said frequency-domain converter is an FFT (Fast Fourier Transform) converter or a DCT (Discrete Cosine Transform) converter.

16. A speech recognition method, which is used to receive and recognize at least one key phrase containing at least one key word, comprising steps:
    receiving a sound source signal of a key word to generate a plurality of audio signals;
    transforming said audio signals into a plurality of frequency signals;
    receiving said frequency signals to obtain a space-frequency spectrum and an angular estimation value thereof;
    receiving said space-frequency spectrum, said angular estimation value and said frequency signals and using said space-frequency spectrum to define and output at least one spatial eigenparameter, and using said angular estimation value and said frequency signals to perform spotting and evaluation and outputting a Bhattacharyya distance; and
    receiving said spatial eigenparameter and said Bhattacharyya distance and using corresponding thresholds to determine correctness of said key phrase;
    wherein said audio signals are received by a sound pick-up array, and wherein said sound pick-up array is in form of an annular arrangement on an identical plane, and wherein said annular arrangement has a central point, and wherein distance between said central point and a circumference of said annular arrangement is R, and wherein said central point is used as an origin of a Cartesian coordinate system having a latitudinal axis X, a longitudinal axis Y and a vertical axis Z, and wherein a sound source point of said sound source signal, said central point and said plane form a triangular plane vertical to said plane, and wherein an angle $\omega$ is contained between a base of said triangular plane and said latitudinal axis X, and wherein an angle $\theta$ is contained between a hypotenuse of said triangular plane and said vertical axis Z, and wherein said space-frequency spectrum is expressed by $$S(\theta, \omega_f) = \frac{1}{a^H(\theta, \omega_f)P_N(\omega_f)a(\theta, \omega_f)},$$

wherein f=1 ... F, and wherein F denotes FFT size, and wherein $\omega_f$ denotes frequency, and wherein $a(\theta,\omega_f)$ and $a^H(\theta,\omega_1)$ are respectively a transposed $a^T(\theta,\omega_f)$ and a conjugated $a^T(\theta,\omega_f)$, and wherein $a^T(\theta,\omega_f)$= $[e^{j2\pi\omega_f*R\ sin\ \phi\ cos\ \theta/c}, e^{j2\pi\omega_f*R\ sin\ \phi\ cos(\theta-2\pi/M)/c}, \ldots, e^{j2\pi\omega_f*R\ sin\ \phi\ cos(\theta-2(M-1)\pi/M)/c}]$, and wherein c denotes light speed, and M is a number of receivers of said sound pick-up array, and wherein $$P_N(\omega_f) = \sum_{i=2}^{M} V(\omega_f)_i V(\omega_f)_i^H,$$

and wherein $V(\omega_f)_i$ and $V(\omega_f)_i^H$ are eigenvectors of a correlation matrix $R_{xx}$, which is obtained via said frequency signals, and wherein $R_{XX}(\omega_f,k)=E(X(\omega_f,k), X(\omega_f,k)^H)$, and wherein $X(\omega_f,k)$ is said frequency signal, and wherein $$R_{XX}(\omega_f) = \sum_{i=1}^{M} \lambda_i(\omega_f)V_i(\omega_f)V_i^H(\omega_f),$$

and wherein $\lambda_i(\omega_f)$ is an eigenvalue of said correlation matrix;
    wherein in said step of using said space-frequency spectrum to define and output at least one spatial eigenparameter, said space-frequency spectrum and said angular estimation value are simultaneously used to define and output two said spatial eigenparameters; and
    wherein said spatial eigenparameter defined by said space-frequency spectrum is an angular estimation quantity $$x_1 = \max_\theta \left[ \frac{\sum_{f \in F'} S(\theta, \omega_f)}{D} \right],$$

and wherein D is a normalization factor and F' a formant frequency band, and wherein said spatial eigenparameter defined by said angular estimation value is an angular estimation variance $x_2=var(\hat{\theta}(\omega_f))$, and wherein $f \in F'$.

17. The speech recognition method according to claim 16, wherein said angular estimation value $\hat{\theta}(\omega_f)=\arg\max_\theta S(\theta,\omega_f)$.

18. The speech recognition method according to claim 16, wherein said step of using said angular estimation value and said frequency signals to perform spotting and evaluation and outputting a Bhattacharyya distance further comprises steps:
    obtaining speech feature data according to said angular estimation value and said frequency signals; and
    receiving said speech feature data, obtaining from a plurality of said resonance model data corresponding to said speech feature data for evaluating said speech feature data, and outputting said Bhattacharyya distance.

19. The speech recognition method according to claim 18, wherein when said several types of resonance model data are respectively curves and peaks of said resonance models, said speech feature data are respectively speech feature curves and speech feature peaks.

20. The speech recognition method according to claim 19, wherein said Bhattacharyya distance is expressed by BC(p, q)=∫√p(x)q(x)dx, and wherein p(x) is said speech feature curve and q(x) is said resonance model curve.

21. The speech recognition method according to claim 16, wherein said key word has a plurality of sound frames, and wherein in said step of receiving said sound source signal, said sound source signals of all said sound frames are successively received for succeeding operations.

22. The speech recognition method according to claim 21, wherein said step of using corresponding thresholds to determine correctness of said key phrase further comprises steps:
using said thresholds to examine said spatial eigenparameter and said Bhattacharyya distance of each said sound frame, and outputting a first-level correctness flag or a first-level incorrectness flag to indicate whether said sound frame is correct;
receiving and storing said first-level correctness flag or said first-level incorrectness flag of each sound frame until all said first-level correctness flags and said first-level incorrectness flags of said key word have been stored; and
outputting a second-level correctness flag or a second-level incorrectness flag to indicate whether said key word is correct according to quantities of said first-level correctness flags and said first-level incorrectness flags.

23. The speech recognition method according to claim 22, wherein said step of using said thresholds to examine said spatial eigenparameter and said Bhattacharyya distance of each said sound frame and outputting a first-level correctness flag or a first-level incorrectness flag further comprises steps:
examining whether at least one of said spatial eigenparameter and said Bhattacharyya distance is equal to or smaller than a corresponding said detection threshold;
if yes, outputting said first-level incorrectness flag; and
if no, outputting said first-level correctness flag.

24. The speech recognition method according to claim 22, wherein said step of outputting a second-level correctness flag or a second-level incorrectness flag according to quantities of said first-level correctness flags and said first-level incorrectness flags further comprises steps:
examining whether a ratio of said first-level correctness flags to said first-level correctness flags plus said first-level incorrectness flags is greater than a first-level identification value;
if yes, outputting said second-level correctness flag; and
if no, outputting said second-level incorrectness flag.

25. The speech recognition method according to claim 22, wherein said key phrase has two or more key words, and wherein after said second-level correctness flag or said second-level incorrectness flag is output are further undertaken steps:
receiving and storing said second-level correctness flag or said second-level incorrectness flag of each said key word until all said second-level correctness flags and said second-level incorrectness flags have been stored; and
outputting a correctness signal or an incorrectness signal to indicate whether said key phrase is correct according to quantities of said second-level correctness flags and said second-level incorrectness flags.

26. The speech recognition method according to claim 25, wherein said step of outputting a correctness signal or an incorrectness signal to indicate whether said key phrase is correct according to quantities of said second-level correctness flags and said second-level incorrectness flags further comprises steps:
examining whether a ratio of said second-level correctness flags to said second-level correctness flags plus said second-level incorrectness flags is greater than a second-level identification value;
if yes, outputting said correctness signal; and
if no, outputting said incorrectness signal.

27. The speech recognition method according to claim 16, wherein in said step of using said angular estimation value and said frequency signals to perform spotting and evaluation, an LPC (Linear Predictive Coding) method or an MFCC (Mel-scale Frequency Cepstral Coefficient) method is adopted.

* * * * *

UNITED STATES PATENT AND TRADEMARK OFFICE
CERTIFICATE OF CORRECTION

PATENT NO. : 8,918,319 B2
APPLICATION NO. : 13/177608
DATED : December 23, 2014
INVENTOR(S) : Hu et al.

Page 1 of 1

It is certified that error appears in the above-identified patent and that said Letters Patent is hereby corrected as shown below:

TITLE PAGE, ITEM [73]:

DELETE THE INCORRECT ASSIGNEE NAME "NATIONAL CHIAO UNIVERSITY" AND REPLACE WITH THE CORRECTED ASSIGNEE NAME --NATIONAL CHIAO TUNG UNIVERSITY--

Signed and Sealed this
Twenty-first Day of June, 2016

Michelle K. Lee
*Director of the United States Patent and Trademark Office*